(12) United States Patent
Hilakos et al.

(10) Patent No.: US 9,745,193 B2
(45) Date of Patent: Aug. 29, 2017

(54) METHOD FOR REMOVING IRON IN THE MANUFACTURE OF PHOSPHORIC ACID

(71) Applicant: Jacobs Engineering Group Inc., Lakeland, FL (US)

(72) Inventors: Stephen W. Hilakos, Lakeland, FL (US); Frank S. Hicks, Lakeland, FL (US)

(73) Assignee: Jacobs Engineering Group Inc., Lakeland, FL (US)

(*) Notice: Subject to any disclaimer, the term of this patent is extended or adjusted under 35 U.S.C. 154(b) by 0 days.

(21) Appl. No.: 15/096,080

(22) Filed: Apr. 11, 2016

(65) Prior Publication Data

US 2016/0289075 A1 Oct. 6, 2016

Related U.S. Application Data

(63) Continuation of application No. PCT/US2015/055458, filed on Oct. 14, 2015.

(60) Provisional application No. 62/161,162, filed on May 13, 2015, provisional application No. 62/072,425, filed on Oct. 30, 2014.

(51) Int. Cl.
| | |
|---|---|
| *C01B 25/223* | (2006.01) |
| *C01B 25/232* | (2006.01) |
| *C01B 25/222* | (2006.01) |
| *C01B 25/22* | (2006.01) |
| *C25B 3/04* | (2006.01) |
| *C01G 49/10* | (2006.01) |
| *C01F 11/46* | (2006.01) |

(52) U.S. Cl.
CPC ......... *C01B 25/232* (2013.01); *C01B 25/222* (2013.01); *C01B 25/223* (2013.01); *C01B 25/2204* (2013.01); *C01F 11/46* (2013.01); *C01G 49/10* (2013.01); *C25B 3/04* (2013.01)

(58) Field of Classification Search
None
See application file for complete search history.

(56) References Cited

U.S. PATENT DOCUMENTS

| | | | |
|---|---|---|---|
| 3,479,139 A | 11/1969 | Koerner | |
| 3,975,178 A * | 8/1976 | McCullough | ......... C01B 25/234 423/321.2 |

(Continued)

OTHER PUBLICATIONS

M.J.A. Rijkenberg et al., "The influence of UV irradiation on the photoreduction of iron in the Southern Ocean," Marine Chemistry 93 (2005) 119-129.

(Continued)

*Primary Examiner* — Wayne Langel
(74) *Attorney, Agent, or Firm* — Seed IP Law Group LLP (57) ABSTRACT

In the manufacture of phosphoric acid from ore, the typical ore comprises minerals containing phosphorus and calcium along with varied amounts of other elements. Certain ores have substantial iron content which needs to be removed in order to produce quality phosphoric acid product. An improved method and associated chemical processing plant are disclosed for removing this iron. The method involves both reducing and adding oxalic acid to wet process phosphoric acid produced using an otherwise conventional manufacturing process. Iron oxalate precipitate is created which can then conveniently be separated therefrom.

18 Claims, 3 Drawing Sheets

(56) References Cited

U.S. PATENT DOCUMENTS

| | | | |
|---|---|---|---|
| 4,018,869 A * | 4/1977 | Beltz | C01B 25/234 |
| | | | 423/321.2 |
| 4,108,957 A | 8/1978 | Michel | |
| 4,117,092 A * | 9/1978 | Beltz | B01D 11/0492 |
| | | | 423/313 |
| 4,220,630 A * | 9/1980 | Ore' | C01B 25/2204 |
| | | | 423/157.4 |
| 4,284,614 A | 8/1981 | Oré | |
| 4,382,916 A | 5/1983 | Beecher | |
| 4,490,336 A | 12/1984 | Worthington et al. | |
| 4,749,455 A | 6/1988 | Lasch et al. | |
| 5,196,580 A | 3/1993 | Ladd et al. | |
| 5,417,955 A | 5/1995 | Connolly | |
| 2005/0281732 A1 | 12/2005 | Kehrmann | |

OTHER PUBLICATIONS

D.K. Singh and H. Singh, "Recovery of oxalate from scrubbing solution containing rare earths and iron during uranium recovery from phosphoric acid," Desalination 232 (2008) 2 pgs.

Joe Guida, Doug Royster, Regis Stana, "Uranium Extraction from Wet Process Phosphoric Acid, The Third Time Around," AICHE presentation 2008, paper 8.1.1., 16 pgs.

* cited by examiner

METHOD FOR REMOVING IRON IN THE MANUFACTURE OF PHOSPHORIC ACID

TECHNICAL FIELD

The present invention pertains to methods for manufacturing phosphoric acid from ore. In particular, it pertains to methods for removing iron in the manufacture of phosphoric acid from ore comprising phosphorus and iron.

BACKGROUND

Phosphoric acid is an important commodity chemical product. Its primary use is in the production of fertilizers but there are numerous additional applications for phosphoric acid with varied requirements for purity.

Phosphoric acid is commonly manufactured using what is known as the wet process method. In this method, an aqueous mixture is prepared which contains an appropriate ore comprising a substantial amount of tricalcium phosphate rock (e.g. by grinding the ore in an aqueous solution to produce an aqueous slurry, or merely combining ore as obtained with water, etc.). Sulfuric acid is added thereto which digests the rock and produces a solution comprising phosphoric acid and other species depending on what other minerals were present in the ore. Calcium sulfate precipitate is also produced and this precipitate is subsequently filtered and separated from the phosphoric acid solution. Depending on the grade (purity) of the phosphoric acid desired, additional process steps may then be required to remove unwanted elements and/or compounds. Preferably however, the complexity and costs associated with any such additional process steps are kept to a minimum.

In the production of international grade granular fertilizers, such as diammonium phosphate (DAP) and monoammonium phosphate (MAP) fertilizers, it is important to achieve certain impurity limits on iron and aluminum content for processing and handling purposes. Further, it is often necessary to achieve certain limits on other elements for environmental reasons (e.g. cadmium).

Ore deposits are frequently characterized by a quantity known as the minor element ratio (MER) which is defined as ratio of the sum of the weight percentages of $Fe_2O_3$, $Al_2O_3$, and MgO present in the ore to that of the $P_2O_5$ present in the ore. It is often considered that the MER of an ore must be less than about 0.1 for the ore to be suitable for the production of DAP. However, many ore deposits which comprise substantial amounts of elemental iron (e.g. greater than 1.2% by weight) are now being identified and considered for use. Thus, methods for simply and economically removing iron are desired in manufacturing phosphoric acid from such ores. Along with undesirable impurities, the ore deposits used for phosphoric acid production may also contain other species with significant commercial value, e.g. rare earth elements. Where economically possible, it is thus desirable to recover this valuable content from the ore.

Numerous techniques have been considered and reported on in the art for producing phosphoric acid and removing impurities and separating other valuable content therefrom. For instance, U.S. Pat. No. 4,108,957 discloses an alternative method to the wet process method for producing phosphoric acid. Crushed phosphate rock is mixed with phosphoric acid to form a slurry and the slurry is then heated to produce calcium monophosphate. Thereafter, oxalic acid is added to the slurry to precipitate the calcium therein as calcium oxalate which is separated. It was noted that the addition of oxalic acid provides a method for producing insoluble forms not only of the calcium values in phosphate rock but also of the metallic impurities (particularly uranium).

However, there is still a need to develop improved techniques for producing phosphoric acid from the wide range of ore deposits found throughout the world and particularly to develop improved techniques for removing impurities, such as iron, and/or to recover, rather than waste, other valuable content in the ore. The present invention addresses these needs and provides other benefits as disclosed below

SUMMARY

A simple and effective method has been developed for removing iron from the wet process phosphoric acid produced in an otherwise conventional process for manufacturing phosphoric acid. The method comprises both reducing the wet process phosphoric acid and adding an amount of oxalic acid thereto. Iron oxalate precipitate is created which can then conveniently be separated therefrom. In an associated chemical processing plant, it can be advantageous to employ the method on only a portion of the wet process phosphoric acid produced. Further, it can be advantageous to recycle the oxalic acid.

Specifically, the method is for manufacturing phosphoric acid from ore comprising phosphorus, calcium, and iron. In particular, the method is suitable for manufacturing phosphoric acid from ore comprising a significant amount of iron, such as ore comprising greater than 1.2% elemental iron by weight.

To produce wet process phosphoric acid, the method initially comprises the steps of a) preparing an aqueous mixture comprising the ore (for example, by grinding the ore in an aqueous solution to produce an aqueous slurry); b) adding sulfuric acid to the aqueous mixture thereby digesting the phosphorus, calcium, and iron and producing a solution comprising phosphoric acid and dissolved iron, and a precipitate comprising calcium sulfate; and c) separating the precipitated calcium sulfate from the phosphoric acid and dissolved iron solution. The phosphoric acid and dissolved iron solution here is the wet process phosphoric acid. Then, as part of the process modification proposed in this inventive method, at least a portion of this phosphoric acid and dissolved iron solution is reduced in a step d) and oxalic acid is added in some suitable manner thereto in a step e). Iron oxalate precipitate and phosphoric acid solution are produced by the combination of steps d) and e) and the precipitated iron oxalate is separated from the phosphoric acid solution in a step f).

The reducing step d) can comprise exposing the portion of the phosphoric acid and dissolved iron solution to iron metal, such as iron balls, iron filings, scrap iron, or powdered iron. The reducing step d) can also comprise exposing the portion of the phosphoric acid and dissolved iron solution to elemental aluminum. Alternatively or additionally, the reducing step d) can be accomplished electrochemically. For instance, the phosphoric acid and dissolved iron solution may be subjected to electrochemical reduction in a cell with a graphite anode and in which a stainless steel container serves as the cathode. Other reducing agents (e.g. other metals, sodium thiosulfate, or the like) may also be considered as well. Further, the reducing step d) can be accomplished by exposing the portion of the phosphoric acid and dissolved iron solution to light with an appropriate wavelength or range of wavelengths (e.g. ultraviolet A or B; UV-A or UV-B).

In the reducing step d), the EMF of the solution relative to the standard hydrogen electrode can desirably be lowered to less than about 450 mV. Lowering the EMF of the solution relative to the standard hydrogen electrode to less than about 300 mV can be even more effective at facilitating the precipitation of iron oxalate.

Further, it can be advantageous in the reducing step d) to protect the portion of the phosphoric acid and dissolved iron solution from exposure to air. Further still, it can be advantageous to carry out the reducing step d) incrementally.

In an exemplary embodiment, the total amount of oxalic acid employed in step e) is less than about 8 grams of oxalic acid dihydrate added per 100 grams of the portion of the phosphoric acid and dissolved iron solution.

In one embodiment of the method, the reducing step d) may be performed before the oxalic acid addition step e). Alternatively, in another embodiment, the oxalic acid addition step e) may be performed before the reducing step d). For instance, the desired reducing may be achieved via initially exposing the phosphoric acid and dissolved iron solution to a small amount of iron metal, followed by a substantial electrochemical reducing. In still further embodiments, both steps may be performed at the same time.

For commercial purposes, it may be adequate and more economical to remove the iron present in just a portion of the phosphoric acid and dissolved iron solution in order to obtain a desired level of iron overall. In such an instance, the portion may for instance comprise less than or about 50% of the phosphoric acid and dissolved iron solution and the method would comprise combining the phosphoric acid solution from step f) with the remaining phosphoric acid and dissolved iron solution from step c). Further still in such an instance, it may advantageous to employ a more aggressive reducing step d) in which for instance the EMF of the solution relative to the standard hydrogen electrode is lowered to less than 100 mV.

The oxalic acid employed in the inventive method may be recycled if desired. For instance, the method can comprise the steps of g) converting the precipitated iron oxalate into a different iron salt and oxalic acid, and h) reusing the oxalic acid in step e). In an exemplary recycling embodiment, step g) comprises adding a solution of calcium chloride to the precipitated iron oxalate thereby producing a solution comprising iron chloride (in either valence II or III state) and a precipitate comprising calcium oxalate, separating the precipitated calcium oxalate from the iron chloride solution, adding an aqueous solution of sulfuric acid to the precipitate of calcium oxalate thereby producing an aqueous solution of oxalic acid and a precipitate comprising calcium sulfate, and separating the precipitated calcium sulfate from the oxalic acid solution.

In another exemplary recycling embodiment, step g) comprises adding a solution of hydrochloric acid to the precipitated iron oxalate thereby producing a complex mixture comprising an iron chloride and oxalic acid solution, iron chloride solids, oxalic acid solids, and iron oxalate precipitate. The mixture is then filtered to produce a filter cake comprising the iron chloride solids, oxalic acid solids, and iron oxalate precipitate, and a filtrate comprising the iron chloride and oxalic acid solution. Next, this filter cake is subjected to a first wash and filtration procedure in which the filter cake is washed and filtered using saturated oxalic acid at a temperature below about 30° C., thereby dissolving and removing the iron chloride solids in the filtrate of the first wash and filtration procedure. The first wash and filtration procedure may involve a single wash and filtration step or a series of wash and filtration steps. (Using more than the stoichiometric amount of HCl required for the basic reaction and adding a portion of that amount to the saturated oxalic acid wash has been found to improve the oxalate recovery and to reduce the scaling tendency of the saturated oxalic acid solution.) Next, the filter cake is subjected to a second wash and filtration procedure in which the filter cake is washed and filtered using unsaturated oxalic acid at a temperature above about 80° C., thereby dissolving and removing the oxalic acid solids in the filtrate of the second wash and filtration procedure. As before, the second wash and filtration procedure may involve a single wash and filtration step or a series of wash and filtration steps. Finally, the oxalic acid is recovered for reuse from the filtrate of the second wash and filtration procedure.

Chemical processing plants for manufacturing phosphoric acid can readily be configured to operate according to the aforementioned method. Such plants can be configured so as to remove iron from all the wet process phosphoric acid produced. An exemplary such chemical processing plant comprises a filter for performing step c) which comprises an outlet for the phosphoric acid and dissolved iron solution. The exemplary plant further comprises a clarifier for clarifying the phosphoric acid and dissolved iron solution. This clarifier comprises an inlet connected to the outlet from the filter, and comprises an outlet for clarified phosphoric acid and dissolved iron solution. The exemplary plant further comprises an evaporator for concentrating phosphoric acid solution which comprises an inlet and an outlet for concentrated phosphoric acid solution. The exemplary plant further comprises a main line connecting the clarifier outlet to the evaporator inlet. The exemplary plant further comprises another clarifier for clarifying the concentrated phosphoric acid solution which comprises an inlet connected to the evaporator outlet, and an outlet for clarified concentrated phosphoric acid solution. And the exemplary plant additionally comprises an iron removal subsystem of the invention for performing steps d), e), and f).

In one embodiment of the aforementioned exemplary chemical processing plant, the iron removal subsystem is located in the main line connecting the outlet of the clarifier for clarifying the phosphoric acid and dissolved iron solution to the evaporator inlet. In this way, iron is removed from all of the wet process phosphoric acid produced.

Such plants can instead be configured so as to remove iron from only a portion of the wet process phosphoric acid produced. An exemplary such chemical processing plant here can comprise a side stream line connected in parallel with the main line in which the side stream line is for receiving the portion of the phosphoric acid and dissolved iron solution of steps d) and e). In this alternative embodiment, the iron removal subsystem is located in the side stream line.

In yet another embodiment, the chemical processing plant comprises a clarifier recycle line connecting the clarifier for clarifying the concentrated phosphoric acid solution to the clarifier for clarifying the phosphoric acid and dissolved iron solution, and the iron removal subsystem is located in the clarifier recycle line.

In yet a still further embodiment, the chemical processing plant comprises a reactor for performing steps a) and b) in which the reactor comprises an inlet for recycled rinse water and an outlet for unfiltered phosphoric acid and dissolved iron solution. The plant further comprises a filter for performing step c) in which the filter comprises an inlet connected to the outlet of the reactor, and an outlet for rinse water. The plant further comprises a recycled rinse water line connecting the reactor inlet for recycled rinse water to the filter outlet for rinse water. The plant additionally comprises an iron removal subsystem for performing steps d), e), and f) in which the iron removal subsystem is located in the recycled rinse water line for treating all or a portion of the recycled rinse water.

In any case, the iron removal subsystem in chemical processing plants of the invention can desirably comprise an oxalate recycling subsystem for converting the precipitated iron oxalate of step f) into a different iron salt and oxalic acid, and then for reusing the oxalic acid in step e).

The invention thus provides a relatively simple and effective way to remove the iron present from wet process phosphoric acid. In a related manner, a similar approach may be considered for removing other elements present, such as cadmium or rare earth elements. Such elements can also appear in significant amounts in the precursor ore. Cadmium is desirable to remove for environmental reasons. Rare earth elements may be desirable to remove and recover as a valuable by-product.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

Herein, in a numerical context, the term "about" is to be construed as meaning plus or minus 10%.

"Wet process phosphoric acid" refers to the mixture obtained after the steps of preparing an aqueous mixture of the phosphate and calcium containing ore, adding sulfuric acid to the mixture to digest the ore, and then separating out precipitated calcium sulfate.

The term "iron" is used frequently throughout this document and at times is used in reference to elemental or metallic iron (e.g. when referring to % weight), to iron oxide (e.g. the form in which it appears in ore) or other iron compounds, and to dissolved iron (e.g. in wet phosphoric acid solution). Where not explicitly stated, those skilled in the art are expected to appreciate the context. And unless otherwise specified, the iron may be in either a ferrous or ferric valence state.

The term "iron oxalate" is also used frequently throughout this document and is used to refer to both anhydrous iron oxalate, namely $FeC_2O_4$, and iron oxalate dihydrate, namely $FeC_2O_4.2H_2O$. The latter form is more commonly found and is more likely encountered with regards to the process of the present invention. Those skilled in the art will appreciate the chemical similarities of the two forms and also the manners in which one form can be converted to the other.

Oxalic acid has the chemical formula $H_2C_2O_4$. However it is commonly available in dihydrate form, namely as $H_2C_2O_4.2H_2O$ crystal. In quantitative contexts herein, amounts are provided in terms of the latter (e.g. grams of oxalic acid dihydrate).

The EMF of a solution is the potential difference measured for the solution in an electrochemical cell relative to the standard hydrogen electrode (SHE).

Throughout this document, quantities expressed in ppm are all made on a weight basis.

An improved method for removing iron from wet process phosphoric acid has been discovered. The method requires both a reducing step and also addition of oxalic acid. The combination of steps produces a substantial amount of yellow coloured precipitate comprising an iron compound which can then be readily separated out from the phosphoric acid. (It is noted that the addition of oxalic acid alone may achieve partial removal of iron from certain wet process phosphoric acid batches depending on the specific circumstances involved. However, employing a reducing step has been found to be important for reliably removing a substantial amount of iron in general.)

Specifically, the method of the invention involves removing iron from wet process phosphoric acid after the calcium sulfate has been removed therefrom. Iron is removed by reducing the wet process phosphoric acid and by adding oxalic acid thereto. A useful measure of the state of reduction is the EMF of the solution relative to SHE. Generally, reduction is performed such that the EMF is lowered below about 450 mV and preferably below about 300 mV. Initially, the more the wet process phosphoric acid solution is reduced, the more effective is the oxalic acid addition in precipitating out iron impurity.

Without being bound by theory, it is believed that the yellow precipitate formed in the method is $FeC_2O_4.2H_2O$ or iron oxalate dihydrate. It is further believed that the dissolved iron in typical wet process phosphoric acid solutions is in the +3 valence state and that the typical EMFs of the solutions are greater than 500 mV. When oxalic acid is added thereto, it is believed that oxalate prefers to complex with iron +3 which is soluble in the solution. Reducing the solution however converts the dissolved iron to the +2 state, which when complexed with oxalate is now insoluble in solution, thereby resulting in the precipitate. If so, it would therefore be important to reduce the solution such that as much of the iron as possible is present is in the +2 state in order to remove it effectively. However, once a very low EMF (e.g. 0 to about 100 mV) has been achieved via reduction, all the iron in solution should already be in a +2 valence state. Up to a certain point then, continued oxalic acid addition results in additional precipitate. Past that point then, further oxalic acid addition would become ineffective. Thus, an excessive amount of oxalic acid provides no significant benefit and is undesirable. Further, excessive reduction and/or too rapid a rate of reduction may result in the unwanted reduction of $SO_4$ compounds present in the solution and thus the undesirable formation of $SO_2$ and $H_2S$. It is therefore believed important to use both a proper amount of oxalic acid and a proper level and rate of reduction.

Reduction of the wet process phosphoric acid solution can be accomplished in a variety of ways known to those skilled in the art. Metallic iron is a suitable reductant and thus exposing the solution to iron surfaces (e.g. iron filings, scrap iron, iron ball towers, or the like) can be suitable. Amounts on the order of a few percent by weight can be sufficient. Somewhat ironically perhaps, this approach amounts to adding iron to the solution in order to remove iron from the solution.

Metals other than iron metal may also be employed as suitable reductants. For instance, elemental aluminum may be a preferred option for instance in cases where the supply of ore is deficient in aluminum. Further, small amounts of other metals are typically present in the wet process phosphoric acid solution (e.g. nickel, zinc), and addition of such elemental metals can also serve to reduce the solution. Further still other reductants known to those in the art may be considered, such as sodium thiosulfate and the like.

Reduction can also optionally be accomplished by electrochemical methods. In such an approach, the solution would be reduced in an appropriate electrochemical cell. For instance, the solution could be contained in a suitable stainless steel container which could serve as the cathode for the electrochemical cell. A suitable anode (e.g. graphite) could then be inserted in the container and an appropriate power source connected across cathode and anode to reduce the solution.

Further, reduction can also optionally be accomplished by exposing the solution to light with an appropriate wavelength or range of wavelengths. For instance, as disclosed in "The influence of UV irradiation on the photoreduction of iron in the Southern Ocean", M. J. A. Rijkenberg et al., Marine Chemistry 93 (2005) 119-129, ultraviolet A or B (UV-A or UV-B) light can be appropriate for this purpose.

Further still, a combination of reduction techniques may desirably be employed. In one possible embodiment for instance, reduction may be accomplished in part via the addition of a small amount of iron metal (e.g. filings) to the solution, with additional reduction accomplished via electrochemical means.

Since excessive reduction and/or reducing too rapidly may result in unwanted side reactions (e.g. reduction of $SO_4$ compounds), it can be desirable to avoid both possible situations by proceeding incrementally. Thus, the addition of iron metal (or other reductant) and/or electrochemical reduction may desirably be carried out relatively slowly and in increments.

Since the wet process phosphoric acid solution may get oxidized as a result of exposure to oxygen (and hence experience a rise in EMF), it can also be preferred to prevent exposure to air during the reducing step. Suitable steps to take in this regard include carrying out the reduction under inert gas (such as nitrogen or argon), minimizing the surface exposed to air, avoiding vortex mixing, minimizing splashing, and the like.

As mentioned, for greater effective removal of iron, it can be advantageous to reduce the solution such that its EMF is quite low (e.g. below about 100 mV). Unfortunately, however, the hardware used to handle and contain the solution becomes much more susceptible to corrosion when the solution is below typical levels circa 500 mV or higher. Specialty steels and/or other materials may thus be required to handle and contain the reduced solution. Suitable such materials are well known to those in the art, but such materials can be relatively expensive and thus add cost to the process. Thus it can be advantageous to minimize the time spent and the size of the hardware involved in handling and containing the solution during the reducing step.

Further in this regard, in order to achieve a target iron impurity level overall, it can actually be advantageous to use the inventive process on only a portion of the wet process phosphoric acid to be treated. For instance, in certain circumstances, one might obtain the same target level of iron impurity in a more economical manner by removing substantially more iron from a portion of a product solution (and thereafter combine the treated portion with the untreated remainder) than by removing a smaller amount of iron from the entire amount of a product solution. In an exemplary case, it may be more economical to remove a substantial amount of iron (e.g. via reduction to an EMF below 100 mV combined with addition of oxalic acid) from about 50% of a product wet process phosphoric acid solution in a side stream arrangement in a chemical processing plant, and then combine this with the rest of the product wet process phosphoric acid solution, than it would be to attempt to remove the same total amount of iron from the product wet process phosphoric acid solution as a whole. While this adds some additional complexity and components to the plant, the size of any required corrosion resistant hardware (tanks, etc.) can be substantially reduced. A further advantage of incorporating a side stream arrangement is that it allows for adjustment in the processing such that product of consistent quality can be obtained from the plant using ore, and hence wet process phosphoric acid, of varying composition. Adjustment can, for instance, be accomplished by varying the amount of wet process phosphoric acid solution diverted through the side stream arrangement.

In yet other embodiments, it may instead be advantageous to use the inventive process in certain recycle streams appearing in typical chemical processing plants for manufacturing phosphoric acid. For instance, as discussed in more detail with regards to FIG. 1 below, it may be advantageous to treat recycled rinse water which has been obtained from the filter used to separate out precipitated calcium sulfate and is being recycled back to the reactor for digesting the ore. Also, for instance, it may be advantageous to treat the recycled sludge obtained from the clarifier used to clarify concentrated phosphoric acid solution and which is recycled via a clarifier recycle line to another clarifier used upstream to clarify the phosphoric acid and dissolved iron solution.

In the inventive method, oxalic acid is also added to the wet process phosphoric acid in order to produce the iron compound precipitate. As will be evident to those in the art, the oxalic acid may be added in a variety of ways. For instance, it may be added directly in solid form and in the form of a hydrate. Alternatively, it may be added in solution form (e.g. already dissolved in water). And further still, it may be added in principle in the form of a salt in which the oxalic acid is formed once the salt has dissolved in the wet process phosphoric acid solution. (This latter option would generally be less preferred since it would involve the introduction of likely unwanted cations from the salt into the solution.)

The reduction and oxalic acid addition steps in the method can be performed in any order or simultaneously. As mentioned above however, to avoid excessive or too rapid reduction, it may be desirable to perform the reduction step more slowly and incrementally.

Figure 1:
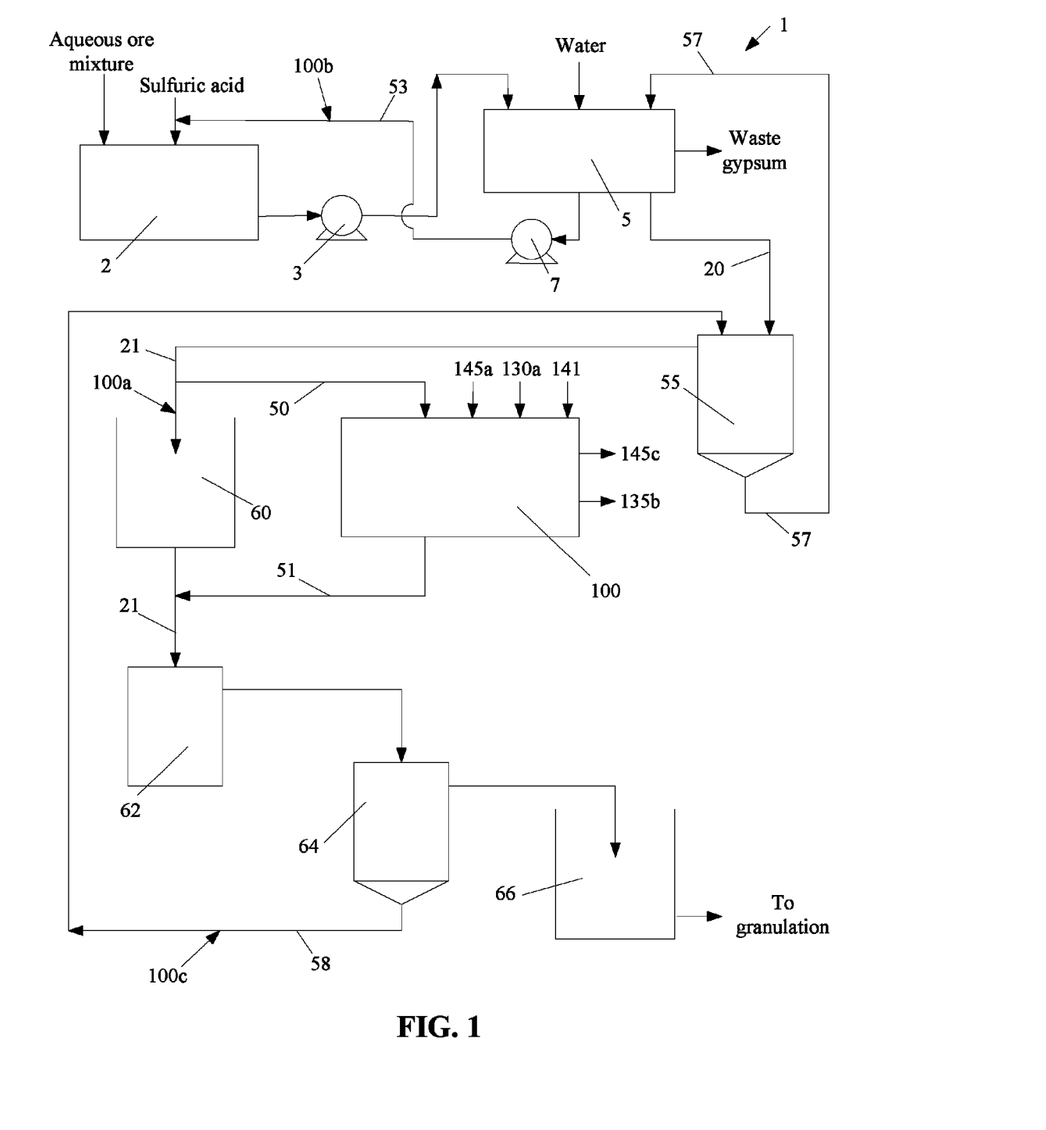
FIG. 1 shows a schematic of a chemical processing plant for manufacturing phosphoric acid in accordance with the invention.

FIG. 1 shows a schematic of one embodiment of a chemical processing plant for manufacturing phosphoric acid in accordance with the invention. Plant 1 comprises subsystem 100 for removing iron from a portion of the wet process phosphoric acid produced elsewhere in plant 1. To accomplish this, subsystem 100 is located in a side stream line (represented by side stream input line 50 and side stream output line 51) which is connected in parallel with main line 21.

With the exception of subsystem 100 and side stream lines 50, 51, the components and layout of plant 1 are conventional. To avoid clutter in the figures, arrows show the direction that relevant materials travel in the various lines throughout plant 1. However, in most cases, neither the lines nor the inputs and outputs on the various components which the lines connect to are called out in the figures. Further to avoid clutter, some conventional components and lines that are not required for purposes of illustrating the present invention have been omitted from FIG. 1 (e.g. certain stirrers, pumps, recycle lines, and the like). Those skilled in the art can be expected to appreciate what additional such components are desirably included and how they are to be appropriately arranged.

In this exemplary embodiment, ore comprising phosphorous, calcium, iron (e.g. >1.2% elemental Fe by weight), and other elemental impurities is ground in water to prepare an aqueous mixture, which is then supplied to reactor 2. Sulfuric acid is also provided to reactor 2. The mixture is stirred and the ore is digested to produce a phosphoric acid solution also comprising dissolved iron and also comprising suspended calcium sulfate precipitate.

The phosphoric acid and dissolved iron solution and calcium sulfate precipitate is then pumped via pump 3 to filter 5 where the calcium sulfate is filtered out of the solution. (As shown here, sludge containing calcium sulfate precipitate from clarifier 55 can also be provided concurrently to filter 5 via line 57.) The phosphoric acid and dissolved iron solution is then directed out from filter 5 via filtrate line 20. At this stage, the phosphoric acid solution is about 28% acid, may have a substantial amount of iron in solution, and typically an EMF relative to the standard hydrogen electrode of >500 mV. The separated calcium sulfate is rinsed with a fresh supply of water to remove traces of acid and the rinse water is returned to reactor 2 via pump 7 in recycled rinse water line 53. After rinsing, the filtered calcium sulfate solids are removed from filter 5 as gypsum waste. The phosphoric acid and dissolved iron solution is then directed via filtrate line 20 to clarifier 55 and is clarified such that additional particles not removed by filter 5 are settled out from the solution. The sludge comprising these settled particles is returned via line 57 to filter 5. The clarified phosphoric acid and dissolved iron solution then is directed out from clarifier 55 via main line 21.

As mentioned, in the exemplary embodiment of FIG. 1, subsystem 100 is located in a side stream line in order to remove iron from a portion of the wet process phosphoric acid. Thus, a portion of the phosphoric acid and dissolved iron solution in main line 21 is directed via side stream input line 50 to subsystem 100. The rest of the phosphoric acid and dissolved iron solution in main line 21 continues along to storage tank 60. The amount of the phosphoric acid and dissolved iron solution to be diverted through subsystem 100 will depend both on the characteristics of the ore being processed (which may change over time) as well as the characteristics desired for the phosphoric acid product. It is expected however that typically the portion to be treated in subsystem 100 would be about 50% or less of the solution in main line 21.

As explained in detail below with reference to FIG. 2, subsystem 100 is used to remove iron from the phosphoric acid and dissolved iron solution directed thereto by side stream input line 50. Subsystem 100 comprises subsystem 101 which serves to remove iron both by reducing the solution and by adding oxalic acid to the solution. Subsystem 100 also comprises subsystem 102 for recycling the oxalate used in the iron removal step. Input 130a for adding an excess of calcium chloride in solution, input 145a for adding boiling water, output 135b for waste iron chloride solution, and output 145c for high quality wallboard gypsum product appear in FIG. 2 and are discussed below. The phosphoric acid and dissolved iron solution is treated in subsystem 100 and then returned to the rest of plant 1 after dissolved iron has been removed via side stream output line 51.

The clarified phosphoric acid solution in storage tank 60 can then be drawn upon as required to mix with an appropriate amount of phosphoric acid solution with reduced iron content from side stream output line 51 to provide a desired blend of phosphoric acid solution (e.g. blend with MER<0.8).

The blended phosphoric acid solution is then directed to evaporator 62 where water is removed by evaporation to increase the concentration from about 28% to about 54% phosphoric acid. The concentrated 54% acid solution is then subjected to an additional clarification step in additional clarifier 64. The sludge from additional clarifier 64 is returned to clarifier 55 via clarifier recycle line 58 while the clarified 54% phosphoric acid solution is directed to storage tank 66. The concentrated phosphoric acid solution is then removed as desired from storage tank 66 for granulation to produce quality DAP or MAP fertilizers.

Figure 2:
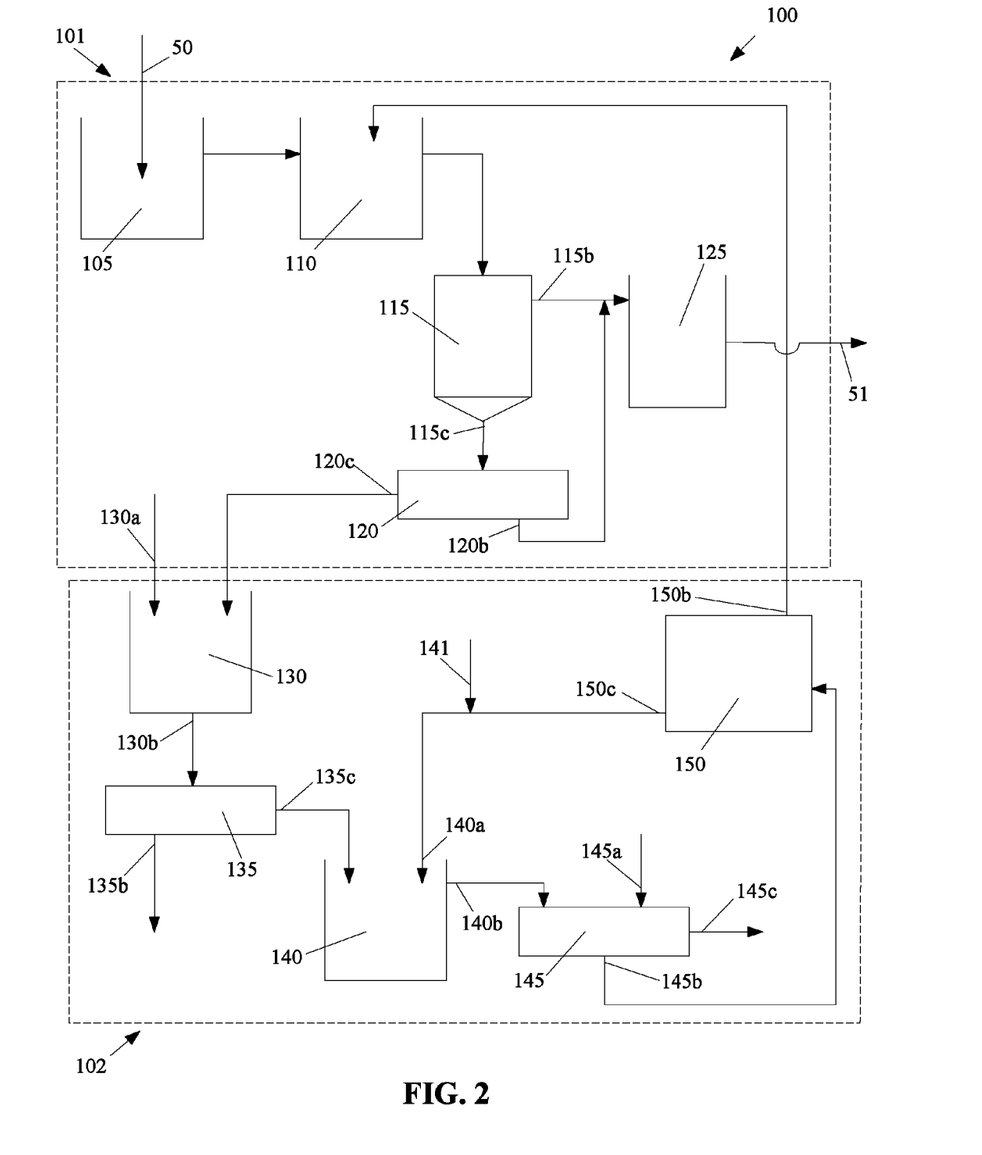
FIG. 2 shows a schematic of subsystems for removing iron and for recycling oxalate within the chemical processing plant of FIG. 1.

FIG. 2 shows a more detailed schematic of subsystem 100 in the chemical processing plant of FIG. 1. Here, subsystem 100 advantageously comprises subsystem 101 specifically for removing iron, as well as subsystem 102 for recycling the oxalate used in the iron removal step and thereby avoiding wastage of this useful reactant.

In this exemplary embodiment, approximately 50% of the wet process phosphoric acid solution in main line 21 is directed to subsystem 100 via side stream input line 50. The solution is approximately 28% phosphoric acid and here has an EMF>500 mV. Iron is then removed from the solution using iron removal subsystem 101. The phosphoric acid solution, now absent the removed iron, is returned to plant 1 via side stream output line 51.

Iron removal subsystem 101 comprises reduction unit 105, oxalic acid mixing tank 110, acid clarifier 115, oxalate filter 120, and phosphoric acid storage tank 125. The wet process solution comprising phosphoric acid and dissolved iron is directed to reduction unit 105 via main line 21. As discussed above, either suitable reductants (such as elemental iron) may be added and/or electrochemical reduction may be performed (with electricity as an input) in reduction unit 105. The reduced solution (with EMF<450 mV and optionally about 100 mV or less) is directed to oxalic acid mixing tank 110 where an appropriate amount of oxalic acid is added. A precipitate forms in accordance with the invention, creating a slurry, which is then directed to acid clarifier 115 where the precipitated oxalate solids settle out from the slurry. The supernatant phosphoric acid is then sent directly from output 115b to phosphoric acid storage tank 125. The settled solids sludge is sent from output 115c to oxalate filter 120 which serves to better separate the precipitated oxalate solids from residual phosphoric acid. This residual phosphoric acid is sent via output 120b so as to combine with the other phosphoric acid in phosphoric acid storage tank 125. The oxalate solids are sent via output 120c to oxalate recycling subsystem 102 in which the oxalic acid is recovered for reuse in the plant.

As mentioned above, those system components exposed to the significantly reduced solution are subject to corrosion and thus must of suitable construction to handle that environment (e.g. reduction unit 105, oxalic acid mixing tank 110, and acid clarifier 115). Elsewhere however, the solution may be adjusted and controlled such that the EMF is above 500 mV to avoid corrosion concerns.

Recycling of the oxalate can be achieved by any method known in the art. An exemplary method is depicted in FIG.

2. Here, oxalate recycling subsystem 102 comprises first reaction tank 130, calcium oxalate filter 135, second reaction tank 140, gypsum filter 145, and oxalic acid crystallizer 150.

In first reaction tank 130, the iron oxalate solids ($FeC_2O_4.2H_2O$) are converted to calcium oxalate ($CaC_2O_4$) and/or calcium oxalate hydrate ($CaC_2O_4.xH_2O$). To do this, an excess of calcium chloride in solution is added at input 130a to the iron oxalate solids and reacted therewith in an acidic environment of pH about 2 to 3 (e.g. obtained via addition of a small amount of HCl). This reaction produces a slurry comprising calcium oxalate hydrate solids and a solution of iron chloride (either $FeCl_2$ and/or $FeCl_3$ and hydrates thereof). The slurry is then sent from output 130b to calcium oxalate filter 135 which serves to separate the precipitated calcium oxalate from the iron chloride solution. The iron chloride solution is directed to waste from output 135b and the separated calcium oxalate solids are directed from output 135c to second reaction tank 140.

In second reaction tank 140, hot concentrated sulfuric acid (e.g. 50+% sulfuric acid at from 80 to 100° C., in part supplied externally at input 141 as 98% sulfuric acid and in part supplied from oxalic acid crystallizer 150) is added at input 140a and then reacted with the calcium oxalate to regenerate oxalic acid in solution and form gypsum solids ($CaSO_4.2H_2O$), thereby creating another slurry. This slurry is directed from output 140b to gypsum filter 145 which serves to separate the gypsum from the oxalic/sulfuric acid solution. The separated gypsum is washed with boiling water introduced at input 145a and the wash water joins the oxalic/sulfuric acid filtrate solution which is directed to oxalic acid crystallizer 150 from output 145b. The washed gypsum is now of wall board quality and is directed out as product gypsum from output 145c of plant 1.

In oxalic acid crystallizer 150, oxalic acid crystal is produced by quenching the oxalic/sulfuric acid solution in a low temperature bath (the solubility of oxalic acid in water is a strong function of temperature, e.g. 84 g/100 g @ 80° C. but only 10 g/100 g @ 20° C.). The oxalic acid crystal is separated from the remaining liquid solution and directed out from output 150b back to iron removal subsystem 101 for reuse. The remaining liquid sulfuric acid and water solution is directed out from output 150c for reuse in second reaction tank 140.

In an alternative method for recycling the oxalate, the precipitated iron oxalate is converted instead into iron chloride via addition of hydrochloric acid. The basic reaction involved here is:

$$FeC_2O_4.H_2O+2HCl+4H_2O \rightarrow H_2C_2O_4.2H_2O+ FeCl_2.4H_2O$$

As before, this reaction is typically performed in a reaction tank. In practice, this produces a mixture containing a liquid portion comprising iron chloride and oxalic acid in solution along with several solids, namely iron chloride solids, oxalic acid solids, and unreacted remaining iron oxalate precipitate. (Rare earth solids may also be present in the mixture depending on the characteristics of the ore involved.) A substantial amount of oxalic acid can be recovered for reuse by separating the various components out from this mixture. Initially, the solids can be separated from the liquid portion by filtering the mixture. This produces a filter cake comprising the iron chloride solids, oxalic acid solids, and iron oxalate precipitate, and a liquid filtrate comprising the iron chloride and oxalic acid solution. Because the solubility of oxalic acid at ambient temperatures is relatively low, the mixture should be filtered at or below ambient temperature to reduce the amount of oxalic acid lost in the purge liquor. The oxalic acid in the filtrate generally does not need to be recovered. The filtrate, or a portion thereof, may be gainfully used in the reaction tank or a purge liquor tank where a "dirty" supply of water that is high in chlorides is acceptable. Further, $FeSO_4.7H_2O$ can advantageously be obtained from this filtrate, or a portion of the filtrate. Rather than merely discarding the iron chloride waste stream, preferably it might instead be reacted with sulfuric acid to produce $FeSO_4.7H_2O$ and hydrochloric acid. $FeSO_4.7H_2O$ is a low grade fertilizer, and thus advantageously could be an additional product instead of a waste stream here. Recovery could be accomplished using a temperature solubility recrystallization step. The hydrochloric acid may be removed for instance as vapour using appropriate heat and vacuum treatment. Other methods for usefully converting the iron chloride in waste streams to iron sulfate are known to those skilled in the art. For instance, U.S. Pat. No. 4,382,916 discloses a method of recovering a wide range of hydrochloric acid concentrations and high quality ferrous sulfate by-product in several hydrate forms from waste pickle liquor containing ferrous chloride. Also for instance, U.S. Pat. No. 5,417,955 and U.S. Pat. No. 7,097,816 disclose alternative methods for converting ferrous chloride from pickling liquors to produce iron sulfates and iron sulfate hydrates.

The iron chloride solids in the filter cake can then essentially be selectively removed from the filter cake by washing the cake with saturated oxalic acid solution. A convenient source of such solution at or near ambient temperature (e.g. below about 30° C.) is generally available at a later stage of the overall process. The iron chloride solids in the filter cake will dissolve in this ambient temperature saturated oxalic acid solution but, being at the saturation limit, the oxalic acid solids will not. The iron oxalate solids in the cake also will not dissolve in the saturated oxalic acid solution. The iron chloride solids are thus removed by subjecting the filter cake to a wash and filtration procedure in which the filter cake is washed and filtered using one or more washes of such saturated oxalic acid. As before, the filtrate or portions thereof, may be reused for subsequent washes and a portion is consumed in the reaction. (Further, it has been found that using more than the stoichiometric amount of HCl required for the basic reaction and adding a portion of that amount to the saturated oxalic acid wash improves the recovery and reduces the scaling tendency of the saturated oxalic acid solution.)

Next, the oxalic acid solids in the filter cake are removed by washing the cake with hot unsaturated oxalic acid solution. Such solution can conveniently be obtained by heating oxalic acid solution available from elsewhere in the process. For instance, oxalic acid solution which is saturated at ambient temperatures is capable of dissolving substantially more solids when at temperatures above about 80° C. The oxalic acid solids in the filter cake will dissolve in this hot unsaturated oxalic acid solution, but the iron oxalate solids will not. The oxalic acid solids are thus removed by way of another wash and filtration procedure in which the filter cake is washed and filtered using one or more washes of such unsaturated oxalic acid. As in the embodiment of FIG. 2, an oxalic acid crystallizer stage can then be used in which the hot filtrate is cooled, thereby causing oxalic acid crystals to form, and the oxalic acid crystals are separated from the liquid (e.g. via additional filtration) in order to recover the oxalic acid for reuse. As before, once the oxalic acid has been removed from the filtrate, the remaining liquid, or portions thereof, may be reused for subsequent washes and/or used elsewhere in the processing plant. After these two wash and filtration steps, iron oxalate solids remain in the filter from the original filter cake. The filter is then cleaned and the waste solids are discarded whereupon the filter is ready for processing another batch of mixture from the reaction tank.

This alternative recycling method offers certain advantages over that illustrated in oxalate recycling subsystem 102 of FIG. 2. The process is generally simpler and the HCl and water reagents are less expensive than those employed there. An iron removal subsystem employing this alternative recycling method would be similar to that shown in FIG. 2 but would incorporate a simpler oxalate recycling subsystem in place of oxalate recycling subsystem 102. A suitable subsystem for this purpose would be configured to provide for sequenced filtration on a plate and frame assembly that can be opened and cleaned as required. The design of such a subsystem may desirably be expected to provide for the recycle of portions of wash solutions where "dirty" solution may be reused acceptably in order to minimize the requirements for clean water and for certain solutions in the process. Those skilled in the art will appreciate that such subsystems may involve numerous holding tanks for the various wash solutions which might be used for removing iron chloride and oxalic acid solids respectively from the filter cake. Such subsystems may thus also involve a substantial piping network for purposes of routing the various wash solutions throughout the subsystem. A preferred design and configuration for a subsystem will depend on the specifics of the application. Those skilled in the art are expected to be capable of optimizing such subsystems accordingly.

FIGS. 1 and 2 show schematics of an embodiment of a chemical processing plant in which iron is removed from only a portion of the wet process phosphoric acid produced in plant 1. In another embodiment however, iron may be removed from all the wet process phosphoric acid stream comprising phosphoric acid and dissolved iron solution. This may be achieved simply by omitting the side stream of FIG. 1 and incorporating an iron removal subsystem similar to subsystem 100 directly into main line 21. Specifically in this other embodiment, storage tank 60 and side stream input and output lines 50, 51 would be omitted from the chemical processing plant shown in FIG. 1, and iron removal subsystem 100 would be located directly in main line 21 (e.g. at location 100*a*).

In yet another possibly desirable embodiment, iron may be removed from the recycled rinse water in recycled rinse water line 53 which is being returned to reactor 2 via pump 7. This rinse water comprises phosphoric acid and dissolved iron solution and removing iron here can be advantageous for at least two reasons. Firstly, reducing the iron content of this recycled rinse water results in a reduction in the iron content of the phosphoric acid solution and calcium sulfate precipitate being directed to filter 5 (via pump 3) in FIG. 1. This improves the filtration rate in filter 5 and reduces water soluble losses. (Higher iron content on the other hand increases the solution viscosity and degrades the filtration process.) Secondly, certain advantages might be obtained here by employing elemental aluminum as a reductant in the reducing step (instead of iron for instance). For instance, some sources of ore are undesirably deficient in aluminum and in such cases aluminum is conventionally added to the reactor during digestion to make up for the deficiency. Conventionally, kaolin (an aluminum silicate) is added for this purpose. However, in the present embodiment, metallic aluminum might be added instead to serve both as a reductant (for the process of the invention) and as a supply of aluminum (i.e. as a substitute for kaolin). While aluminum is generally more expensive than iron, use of aluminum in this manner allows for the elimination of other process equipment, feeders, silos, unloading stations, and the like along with eliminating a requirement for an alternative reductant (e.g. addition of elemental iron) which in turn can reduce consumption of oxalate. Further, addition of aluminum increases filtration rates and can desirably modify the shape of the gypsum formed as it crystallizes in the reactor.

Such an embodiment would thus appear similar to that shown in FIG. 1 except that the side stream arrangement would be omitted and the iron removal subsystem would be relocated so as to treat the recycled rinse water. Specifically in this embodiment, storage tank 60 and side stream input and output lines 50, 51 would again be omitted from the chemical processing plant shown in FIG. 1. And iron removal subsystem 100 would now be located directly in recycled rinse water line 53 (e.g. at location 100*b*). Further, elemental aluminum might desirably be used as a reductant in reduction unit 105. Note that, as mentioned above, if appropriate steps are taken within iron removal subsystem 100 to adjust and control the EMF of the solution after treatment (e.g. to be above 500 mV), corrosion concerns with regards to supplying reduced rinse water to reactor 2 can be avoided.

In a further potentially desirable embodiment, iron may be removed from the recycling sludge in clarifier recycle line 58 which is being returned to clarifier 55 from clarifier 64 as shown in FIG. 1. For instance, in many commercial chemical processing plants, the iron level in the product clarified 54% phosphoric acid solution can be acceptable without using any special iron removal processes. However, there may still be a commercially significant amount of phosphoric acid (e.g. ~1% to 2% of total) in the sludge appearing in additional clarifier 64 (FIG. 1) that is quite contaminated with iron. As shown in FIG. 1, while this sludge is recycled back for reuse within the chemical processing plant, ultimately this phosphoric acid may be lost as iron and aluminum phosphate solids in the waste gypsum stream.

In this alternative embodiment of the invention then, the iron contaminant is removed and the phosphoric acid recovered from the sludge obtained from clarifier 64. Here, it is generally preferable to add oxalic acid to the sludge before carrying out the reducing step in accordance with the invention. Adding the oxalic acid first is advantageous in that it assists in dissolving the sludge. Consequently, more of the phosphoric acid and iron from the sludge appears in solution which in turn can be recovered and separated therefrom accordingly. This alternative embodiment would thus also appear similar to that shown in FIG. 1 except again the side stream arrangement would be omitted and the iron removal subsystem would be relocated so as to treat the recycling sludge. Specifically in this embodiment, storage tank 60 and side stream input and output lines 50 and 51 would again be omitted from the chemical processing plant shown in FIG. 1. Iron removal subsystem 100 would now be located directly in clarifier recycle line 58 (e.g. at location 100*c*). Advantageously, to treat the recycling sludge, the size of the iron removal subsystem in this embodiment would be much smaller than those required in the previous embodiments.

The improved method of the invention is effective in removing iron from wet process phosphoric acid solutions. It is expected though that it can also be effective in removing other elemental impurities from such solutions. The other elemental content can vary significantly depending on the source of the ore used in manufacture. But along with iron, Al and Mg are other typical major impurities. Smaller amounts of impurities such as Cd, Co, Cu, Mn, Ni, Zn, and rare earth metals are also common. It is expected that it is possible to remove these using a similar approach, although certain of these impurities may precipitate out together. Thus, if separation is desired, an additional separation step or steps may need to be employed. Of particular importance would be the ability to remove Cd for environmental reasons and to remove rare earth metals for recovery as product.

It is also expected that other acids chemically analogous to oxalic acid may be suitable for use in the present invention instead of or in addition to oxalic acid. For instance, 3, 4, or more carbon chain d-carboxylic acids or mixtures thereof may be suitable (e.g. malonic acid, tartaric acid, succinic acid, malic acid, glutamic acid, etc.).

The preceding description discloses exemplary apparatus for accomplishing certain steps and processes associated with the method of the invention. However as is known to those in the art, other components and/or configurations may be employed to accomplish these. Depending on the specific circumstances involved, it may be preferable to employ alternative components and/or configurations. For instance, instead of using clarifiers, solids separation might be accomplished using centrifuges or the like.

The following examples are illustrative of aspects of the invention but should not be construed as limiting in any way.

EXAMPLES

Two relatively similar types of ore were used in the following Examples. Both ores were for use in the manufacture of phosphoric acid and had relatively high iron content. Ore "A" had the following average composition: 31.05% $P_2O_5$, 46.58% CaO, 0.81% MgO, 2.92% $Fe_2O_3$, 0.39% $Al_2O_3$, 0.87% $Na_2O$, 0.10% $K_2O$, and 3.18% F by weight with a MER of 0.133. Ore "B" had the following average composition: 32.38% $P_2O_5$, 48.29% CaO, 0.54% MgO, 2.51% $Fe_2O_3$, 0.29% $Al_2O_3$, 1.01% $Na_2O$, 0.07% $K_2O$, and 3.18% F with a MER of 0.103.

Wet process phosphoric acid solutions were prepared from these ores in a conventional manner by digesting with sulfuric acid and then separating out precipitated calcium sulfate. As is conventional practice in such preparation, the EMFs of the solutions were controlled to always be greater than 500 mV with respect to SHE in order to avoid corroding the processing hardware. The resulting solutions typically had the following characteristics: wet process phosphoric acid solution A was 28.14% $P_2O_5$, 2.45% $Fe_2O_3$, 0.32% $Al_2O_3$, and 0.71% MgO by weight with a MER of 0.124; and wet process phosphoric acid solution B was 29.55% $P_2O_5$, 2.17% $Fe_2O_3$, 0.44% $Al_2O_3$, and 0.45% MgO with a MER of 0.104.

Example 1

6 g of oxalic acid dihydrate was then added to 100 g of each of the wet process phosphoric acid solutions A and B and mixed together. After about 10 minutes, no visible change was apparent in either solution. Then, approximately 1 gm of elemental iron was added to each solution in the form of shavings and dissolved therein. After about 10 minutes, the solutions had turned bright yellow and suspended particles could be observed therein.

This Example shows that addition of oxalic acid alone may not be effective in removing iron from wet process phosphoric acid solutions.

Example 2

The effect of EMF on samples of wet process phosphoric acid solution which had been treated with oxalic acid was studied here. Ore type A and wet process phosphoric acid solution prepared therefrom was used here. Several 100 g samples of solution were obtained and 4 g of oxalic acid dihydrate was added to each and mixed together for about one minute at room temperature. (Theoretically, 4 g of oxalic acid dihydrate would react with and hence could remove 2.64% $Fe_2O_3$ in these 100 g solution samples with 100% efficiency.) Then, the EMF of each solution was adjusted by dissolving small amounts of added elemental iron into the solution. EMF was determined using a commercial oxidation reduction potential probe. Except as indicated below, the samples were allowed to stand for 24 hours and then filtered on 40 micron glass fret filters. The composition of the other components in the phosphoric acid solutions was determined by inductively coupled plasma (ICP) (In certain samples only the iron composition was determined.)

The results of this study are summarized in Table 1 below which lists the compositions determined at each of the various EMFs used. Since the iron, aluminum, magnesium, and calcium in the solution are present in their oxide form, the amounts of these elements are expressed in terms of % metal oxide in solution by weight. Further, note that the amount of $Fe_2O_3$ is expressed as amount removed, while the amounts of the other oxides are expressed as amount remaining. In this example, for 100% efficient removal, it was calculated that 2.64% $Fe_2O_3$ would need to be removed. The amounts of the elements Co, Cr, Ni, Pb and Zn are expressed in ppm.

TABLE 1

| Sample EMF (mV) | % $Fe_2O_3$ removed | % $Al_2O_3$ remaining | % MgO remaining | % CaO remaining | Co (ppm) | Cr (ppm) | Ni (ppm) | Pb (ppm) | Zn (ppm) |
|---|---|---|---|---|---|---|---|---|---|
| 596 | 0.09 | 0.31 | 0.70 | 0.28 | 8 | 32 | 31 | 9 | 73 |
| 567 | 0.07 | 0.32 | 0.71 | 0.27 | 8 | 32 | 32 | 8 | 75 |
| 467 | 0.08 | 0.32 | 0.71 | 0.26 | 8 | 32 | 32 | 8 | 82 |
| 417 | 0.28 | 0.31 | 0.70 | 0.28 | 7 | 32 | 24 | 8 | 58 |
| 413 | 0.57 | 0.31 | 0.70 | 0.26 | 3 | 33 | 12 | 8 | 31 |
| 395 | 0.89 | 0.32 | 0.73 | 0.25 | 2 | 35 | 6 | 8 | 14 |
| 389 | 1.24 | 0.31 | 0.72 | 0.25 | 1 | 34 | 5 | 8 | 8 |
| 381 | 1.12 | — | — | — | — | — | — | — | — |
| 345 | 1.55 | — | — | — | — | — | — | — | — |
| 324 | 1.87 | — | — | — | — | — | — | — | — |
| 300* | 2.09 | — | — | — | — | — | — | — | — |
| 80* | 2.25 | — | — | — | — | — | — | — | — |

*sample allowed to stand only 2 hours before measuring

This Example shows the marked effect that EMF has on the efficacy of removal of iron oxide from the solutions. Also, noteworthy is that the amounts of aluminum and magnesium oxide are essentially unchanged.

Example 3

In this example, samples of wet process phosphoric acid solution from ore A were treated with varying amounts of oxalic acid and at different EMFs. EMFs were set and measured as in Example 2 above. And the amounts of iron oxide in solution were determined as in Example 2 above.

The starting wet process phosphoric acid solution in all cases comprised 2.55% $Fe_2O_3$. Again, 100 g samples of solution were used. Amounts of either 0, 4.0, 6.0 or 8.0 g of oxalic acid dihydrate were added to these samples. And samples were held at EMFs of either 354, 275, 265 or 177 mV for 24 hours in this set of tests. Table 2 summarizes the results obtained for each of the combinations of test conditions, the grams of $Fe_2O_3$ removed from solution, and the % $Fe_2O_3$ remaining in solution.

TABLE 2

| EMF (mV) | Oxalic acid dihydrate added (g) | $Fe_2O_3$ removed (g) | $Fe_2O_3$ remaining (%) |
|---|---|---|---|
| 354 | 0 | — | 3.62 |
| 354 | 4 | 1.86 | 1.76 |
| 354 | 6 | 2.39 | 1.23 |
| 275 | 0 | — | 3.90 |
| 275 | 4 | 2.29 | 1.61 |
| 275 | 6 | 3.16 | 0.74 |
| 265 | 0 | — | 3.88 |
| 265 | 4 | 2.12 | 1.76 |
| 265 | 6 | 3.11 | 0.77 |
| 265 | 8 | 3.56 | 0.32 |
| 177 | 0 | — | 3.97 |
| 177 | 4 | 2.43 | 1.54 |
| 177 | 6 | 3.26 | 0.71 |

Figure 3:
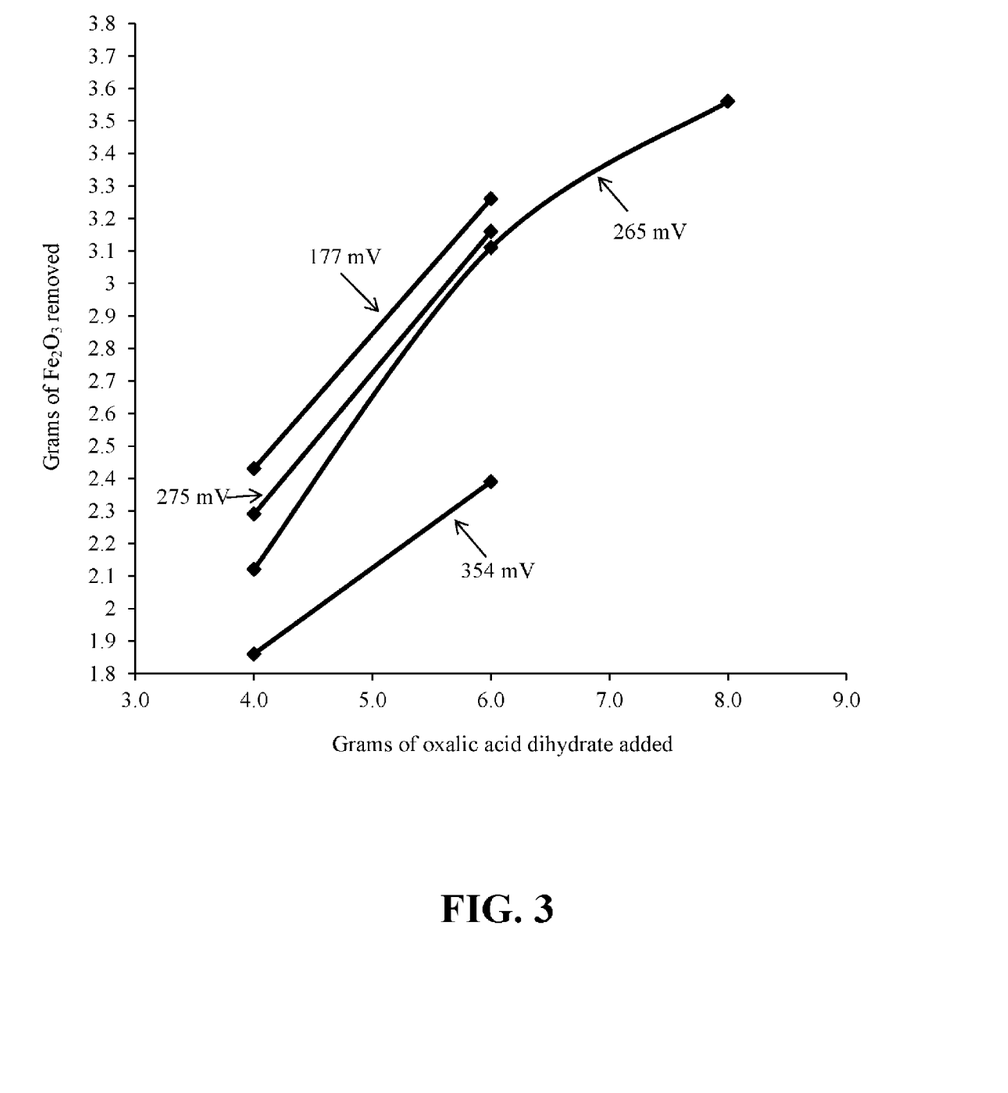
FIG. 3 shows plots of the weight of $Fe_2O_3$ removed versus weight of oxalic acid dihydrate added at various EMF levels in an exemplary experiment of the Examples.

FIG. 3 shows plots of the weight of $Fe_2O_3$ removed at various EMF levels versus weight of oxalic acid dihydrate added (when oxalic acid was added).

The data in Table 2 and FIG. 3 illustrate the effect that EMF and amount of oxalic acid have on the efficacy of iron oxide removal from the solutions. As before, this Example demonstrates the marked effect of EMF on this process. Generally the lower the EMF, the greater the amount of iron oxide removed. However, the effect is quite significant as the EMF is lowered to values less than about 300 mV.

Example 4

Two larger 4000 g samples of wet process phosphoric acid solutions from each of ores A and B were treated in this Example. The composition of each was measured as above and then iron oxide was removed in accordance with the method of the invention. Specifically, 6 gram of oxalic acid dihydrate was added per 100 g of solution in each case. Then, over the course of about 24 hours, elemental iron was dissolved step-wise (in about 5 increments every few hours or so) into the solutions in order to bring the EMFs below 100 mV. After treatment, the samples were filtered as before and the composition of the solutions was determined again. Table 3 shows the composition of these two sample solutions before and after treatment.

TABLE 3

| Solution | % $P_2O_5$ | % $Fe_2O_3$ | % $Al_2O_3$ | % MgO | MER |
|---|---|---|---|---|---|
| From ore A before iron removal | 28.14 | 2.45 | 0.32 | 0.71 | 0.124 |
| From ore A after iron removal | 28.42 | 0.59 | 0.27 | 0.68 | 0.054 |
| From ore B before iron removal | 29.55 | 2.17 | 0.44 | 0.45 | 0.104 |
| From ore B after iron removal | 29.70 | 0.50 | 0.35 | 0.40 | 0.042 |

In a commercial manufacturing process, $P_2O_5$ can be lost in certain steps. To get an idea of the potential for recovery of phosphoric acid when using the present process, the precipitates obtained in each test above were washed and the wash water collected to recover as much phosphoric acid as possible. The precipitate was then re-pulped in rinse water, allowed to settle as final waste solids, and the re-pulp water was collected, again to potentially collect more phosphoric acid. The wash water, re-pulp water, and waste solids were then also analyzed for $P_2O_5$ content. Tables 4a and 4b show the % $P_2O_5$ recovered at each step for each of the wet process phosphoric acid solutions, the % found in the waste solids, and finally the calculated amount that could not be accounted for.

TABLE 4a $P_2O_5$ recovered from ore A solution after iron removal

| Item | % $P_2O_5$ recovered |
|---|---|
| Phosphoric acid product | 91.1 |
| Wash water | 3.2 |
| Re-pulp water | 3.0 |
| Waste solids | 1.2 |
| Unaccounted | 1.6 |

TABLE 4b $P_2O_5$ recovered from ore B solution after iron removal

| Item | % $P_2O_5$ recovered |
|---|---|
| Phosphoric acid product | 92.0 |
| Wash water | 3.4 |
| Re-pulp water | 2.4 |
| Waste solids | 0.5 |
| Unaccounted | 1.6 |

As is evident from Table 4, the overall $P_2O_5$ losses associated with use of the iron removal process were less than 3%. This Example shows that the method of the invention is very effective in removing iron from wet process phosphoric acid solution without significant loss of phosphoric acid.

Example 5

As an illustrative example, the effect that varied amounts of oxalic acid dihydrate had on composition when added to wet process phosphoric acid was determined here. In this Example, no EMF adjustment was made nor was EMF determined. The Example is provided to illustrate that the inventive method may also be expected to be useful in removing other metal species from phosphoric acid solution.

Again here, 100 g wet process phosphoric acid samples were used that were similar to that used in Example 1. The composition of the solutions before and after oxalic acid addition was determined as above. The indicated amount of oxalic acid dihydrate was added, mixed as before, and the solutions then were allowed to stand for 90 hours. Again, the sample solutions were filtered on 40 micron glass fret filters before determining composition. Table 5 summarizes the results and provides the % weight of the $P_2O_5$ and other oxides present along with the amounts in ppm of certain other metals.

TABLE 5

| Acid added g/100 g | $P_2O_5$ % | $Fe_2O_3$ % | $Al_2O_3$ % | MgO % | CaO % | Cd ppm | Co ppm | Cu ppm | Mn ppm | Ni ppm | Pb ppm | Zn ppm |
|---|---|---|---|---|---|---|---|---|---|---|---|---|
| 0 | 24.4 | 3.50 | 0.28 | 0.13 | 0.15 | 7.1 | 2.9 | 8.7 | 85.6 | 170 | 0.9 | 266 |
| 0.6 | 24.5 | 3.51 | 0.28 | 0.13 | 0.15 | 7.0 | 2.8 | 7.9 | 85.7 | 169 | 1.4 | 263 |
| 1.7 | 24.6 | 2.92 | 0.27 | 0.13 | 0.16 | 6.4 | 1.8 | 0.4 | 84.3 | 79 | 0.6 | 115 |
| 4.2 | 24.4 | 2.01 | 0.26 | 0.13 | 0.15 | 5.2 | 0.9 | nd | 77.5 | 34 | 0.8 | 48 |
| 7.2 | 24.5 | 1.64 | 0.25 | 0.13 | 0.15 | 4.8 | 0.6 | nd | 74.4 | 22 | 0.9 | 32 |

As is evident from Table 5 above, the amounts of the other metals measured here (e.g. Cd, Co, Cu, Mn, Ni, Pb, Zn) can be reduced via addition of oxalic acid.

Example 6

A phosphoric acid solution was prepared from rock with a high iron content in a conventional manner using a commercial chemical processing plant as shown in FIG. 1 but absent iron removal subsystem 100. The phosphoric acid solution was concentrated to 54% and clarified as shown in FIG. 1 by phosphoric acid evaporator 62 and clarifier 64. A sample of the resulting sludge from clarifier 64 was obtained and chemically analyzed. The sludge contained 38.5% $P_2O_5$ and 13.4% $Fe_2O_3$ by weight. Iron was then removed from this sample according to the method of the invention. Here, oxalic acid was added first to dissolve the solids in the sludge. Approximately 80% of the sludge solids ultimately dissolved, while 20% did not. This mixture was then filtered and the filtrate separated from the residual sludge solids. The filtrate was then reduced according to the method of the invention, thereby forming iron oxalate precipitate. Again, this mixture was filtered to remove the iron oxalate solids from the final product filtrate. The residual sludge solids, the iron oxalate solids, and the product filtrate were chemically analyzed for phosphoric acid and iron content. Table 6 summarizes the % of $P_2O_5$ and $Fe_2O_3$ which were recovered from the original sludge in each of these components.

TABLE 6

| Component | % $P_2O_5$ recovered | % $Fe_2O_3$ recovered |
|---|---|---|
| Product Filtrate | 94.2 | 7.7 |
| Residual Sludge Solids | 4.9 | 5.3 |
| Iron Oxalate Solids | 0.9 | 87.0 |

This Example confirms that commercially significant amounts of the phosphoric acid content that appears in the clarifier sludge of typical commercial processing plants can be recovered. Further, this Example demonstrates that the majority of this phosphoric acid content can be successfully separated from the iron contaminant and recovered using the method of the invention.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, use of the invention for the treatment of industrial effluents and other process streams can also be considered. Such modifications are to be considered within the purview and scope of the claims appended hereto.

The invention claimed is:

1. A method for manufacturing phosphoric acid from ore comprising phosphorus, calcium, and iron, the method comprising the following steps:
   a) preparing an aqueous mixture comprising the ore;
   b) adding sulfuric acid to the aqueous mixture thereby digesting the phosphorus, calcium, and iron and producing a solution comprising phosphoric acid and dissolved iron, and a precipitate comprising calcium sulfate;
   c) separating the precipitated calcium sulfate from the phosphoric acid and dissolved iron solution;
   d) reducing at least a portion of the phosphoric acid and dissolved iron solution wherein the reducing lowers the EMF of the solution relative to the standard hydrogen electrode to less than about 450 mV;
   e) adding oxalic acid to the portion of the phosphoric acid and dissolved iron solution;
   whereby iron oxalate precipitate and phosphoric acid solution is produced by the combination of steps d) and e); and
   f) separating the precipitated iron oxalate from the phosphoric acid solution.

2. The method of claim 1 wherein the ore comprises greater than 1.2% elemental iron by weight.

3. The method of claim 1 wherein step d) comprises exposing the portion of the phosphoric acid and dissolved iron solution to iron metal.

4. The method of claim 3 wherein the iron metal comprises iron balls, iron filings, scrap iron, or powdered iron.

5. The method of claim 1 wherein step d) is accomplished electrochemically.

6. The method of claim 1 wherein step d) comprises exposing the portion of the phosphoric acid and dissolved iron solution to light.

7. The method of claim 6 wherein the light is ultraviolet A or ultraviolet B.

8. The method of claim 1 wherein step d) comprises exposing the portion of the phosphoric acid and dissolved iron solution to elemental aluminum.

9. The method of claim 1 wherein step d) lowers the EMF of the solution relative to the standard hydrogen electrode to less than about 300 mV.

10. The method of claim 1 comprises protecting the portion of the phosphoric acid and dissolved iron solution from exposure to air during step d).

11. The method of claim 1 wherein step d) comprises incrementally reducing the portion of the phosphoric acid and dissolved iron solution.

12. The method of claim 1 wherein less than about 8 grams of oxalic acid dihydrate is added per 100 grams of the portion of the phosphoric acid and dissolved iron solution in step e).

13. The method of claim 1 wherein step e) is performed before step d).

14. The method of claim 1 wherein the portion comprises less than or about 50% of the phosphoric acid and dissolved iron solution and the method comprises combining the phosphoric acid solution from step f) with the remaining the phosphoric acid and dissolved iron solution from step c).

15. The method of claim 14 wherein step d) lowers the EMF of the solution relative to the standard hydrogen electrode to less than 100 mV.

16. The method of claim 1 comprising:
g) converting the precipitated iron oxalate into a different iron salt and oxalic acid; and
h) reusing the oxalic acid in step e).

17. The method of claim 16 wherein step g) comprises:
adding a solution of calcium chloride to the precipitated iron oxalate thereby producing a solution comprising iron chloride and a precipitate comprising calcium oxalate;
separating the precipitated calcium oxalate from the iron chloride solution;
adding an aqueous solution of sulfuric acid to the precipitate of calcium oxalate thereby producing an aqueous solution of oxalic acid and a precipitate comprising calcium sulfate; and
separating the precipitated calcium sulfate from the oxalic acid solution.

18. The method of claim 16 wherein step g) comprises:
adding a solution of hydrochloric acid to the precipitated iron oxalate thereby producing a mixture comprising an iron chloride and oxalic acid solution, iron chloride solids, oxalic acid solids, and iron oxalate precipitate;
filtering the mixture thereby producing a filter cake comprising the iron chloride solids, oxalic acid solids, and iron oxalate precipitate, and a filtrate comprising the iron chloride and oxalic acid solution;
subjecting the filter cake to a first wash and filtration procedure wherein the filter cake is washed and filtered using saturated oxalic acid at a temperature below about 30° C., thereby dissolving and removing the iron chloride solids in the filtrate of the first wash and filtration procedure;
subjecting the filter cake to a second wash and filtration procedure wherein the filter cake is washed and filtered using unsaturated oxalic acid at a temperature above about 80° C., thereby dissolving and removing the oxalic acid solids in the filtrate of the second wash and filtration procedure; and
recovering the oxalic acid from the filtrate of the second wash and filtration procedure.

\* \* \* \* \*